(12) United States Patent
Yang et al.

(10) Patent No.: US 11,204,671 B2
(45) Date of Patent: Dec. 21, 2021

(54) PEN, METHOD FOR DETECTING PEN, AND TOUCH SYSTEM

(71) Applicants: Hefei BOE Optoelectronics Technology Co., Ltd., Anhui (CN); BOE Technology Group Co., Ltd., Beijing (CN)

(72) Inventors: Guanglei Yang, Beijing (CN); Zhixiang Fang, Beijing (CN); Meng Wang, Beijing (CN); Peng Ding, Beijing (CN); Xuxu Hu, Beijing (CN)

(73) Assignees: Hefei BOE Optoelectronics Technology Co., Ltd., Hefei (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/815,300

(22) Filed: Mar. 11, 2020

(65) Prior Publication Data

US 2021/0165510 A1    Jun. 3, 2021

(30) Foreign Application Priority Data

Nov. 28, 2019 (CN) .......................... 201911212044.X

(51) Int. Cl.
*G06F 3/044* (2006.01)
*G06F 3/041* (2006.01)
*G06F 3/0354* (2013.01)

(52) U.S. Cl.
CPC ........ *G06F 3/0442* (2019.05); *G06F 3/03545* (2013.01); *G06F 3/0441* (2019.05); *G06F 3/04162* (2019.05); *G06F 2203/04106* (2013.01)

(58) Field of Classification Search
CPC .. G06F 3/0441; G06F 3/0442; G06F 3/04162; G06F 3/03545
See application file for complete search history.

(56) References Cited

U.S. PATENT DOCUMENTS

| | | | | |
|---|---|---|---|---|
| 5,448,024 A * | 9/1995 | Kawaguchi | ........... | G06F 3/0412 178/18.07 |
| 9,213,424 B1 * | 12/2015 | Dunn | ................... | G06F 3/04162 |
| 10,303,272 B2 * | 5/2019 | Ho | .......................... | G06F 3/038 |
| 10,474,254 B2 * | 11/2019 | Yeh | ........................ | B43K 29/08 |
| 10,845,918 B2 * | 11/2020 | Chen | ........................ | H04W 4/80 |
| 2015/0077403 A1 * | 3/2015 | Bell | ........................ | G06F 3/0441 345/179 |

(Continued)

*Primary Examiner* — Gene W Lee
(74) *Attorney, Agent, or Firm* — Banner & Witcoff, Ltd.

(57) ABSTRACT

A pen, a method for detecting a pen, and a touch system are disclosed. The pen is configured to operate on a touch panel. The pen includes a controller, a transmitting electrode, and a receiving electrode. The transmitting electrode and the receiving electrode are at different positions of the pen. The receiving electrode is configured to receive a first signal transmitted by the touch panel and transmit the first signal to the controller. The controller is configured to receive the first signal, determine an inclination angle between the pen and the touch panel according to a signal amount of the first signal, generate a second signal by using an encoding format corresponding to the inclination angle, and transmit the second signal to the transmitting electrode. The transmitting electrode is configured to receive the second signal and transmit the second signal to the touch panel.

16 Claims, 4 Drawing Sheets

(56) References Cited

U.S. PATENT DOCUMENTS

| | | | | |
|---|---|---|---|---|
| 2016/0299585 A1* | 10/2016 | Lee | .................... | G06F 3/03545 |
| 2017/0357338 A1* | 12/2017 | Bell | .................... | G06F 3/03545 |
| 2018/0081457 A1* | 3/2018 | Dai | ....................... | G06F 3/0383 |
| 2018/0081492 A1* | 3/2018 | Kim | ...................... | G06F 3/0488 |
| 2018/0129307 A1* | 5/2018 | Ju | ........................ | G01L 5/0038 |
| 2018/0246587 A1* | 8/2018 | Dekel | .................. | G06F 3/0442 |
| 2020/0192523 A1* | 6/2020 | Lee | .................... | G06F 3/03545 |
| 2020/0201505 A1* | 6/2020 | Jung | ................... | G06F 3/03545 |
| 2020/0225773 A1* | 7/2020 | Yamamoto | ............ | G06F 3/0383 |

* cited by examiner

PEN, METHOD FOR DETECTING PEN, AND TOUCH SYSTEM

CROSS-REFERENCE

The application claims priority to Chinese patent application No. 201911212044.X, filed on Nov. 28, 2019. For all purposes under the U.S. law, the entire disclosure of the aforementioned application is incorporated by reference as part of the disclosure of this application.

TECHNICAL FIELD

Embodiments of the present disclosure relate to a pen, a method for detecting a pen, and a touch system.

BACKGROUND

A pen is used to input instructions to devices having touch screens, such as a computer screen, a mobile device, a graphics tablet, etc., and users can click on the touch screen with the pen to select files or perform drawing.

SUMMARY

At least one embodiment of the present disclosure provides a pen configured to operate on a touch panel, and the pen includes: a controller, a transmitting electrode, and a receiving electrode; the transmitting electrode and the receiving electrode are at different positions of the pen; the receiving electrode is coupled to the controller, and the receiving electrode is configured to receive a first signal transmitted by the touch panel and transmit the first signal to the controller; the controller is further coupled to the transmitting electrode, and the controller is configured to receive the first signal from the receiving electrode, determine an inclination angle between the pen and the touch panel according to a signal amount of the first signal, generate a second signal by using an encoding format corresponding to the inclination angle, and transmit the second signal to the transmitting electrode; and the transmitting electrode is configured to receive the second signal from the controller and transmit the second signal to the touch panel.

For example, the pen provided by an embodiment of the present disclosure further includes a pen body and a pen tip, the transmitting electrode is at a position of the pen tip, the receiving electrode is at a position, away from the transmitting electrode by a first distance, of the pen body, and the controller is inside the pen body.

For example, in the pen provided by an embodiment of the present disclosure, a frequency of the second signal is determined according to a stress level of the pen, and the frequency of the second signal changes with a change of the stress level of the pen.

For example, in the pen provided by an embodiment of the present disclosure, the controller further includes a signal processing circuit and a signal generating circuit, and the signal processing circuit is coupled to the signal generating circuit; the signal processing circuit is configured to calculate the signal amount of the first signal, determine the inclination angle corresponding to the signal amount of the first signal and the encoding format corresponding to the inclination angle according to a first signal level mapping table, and output the encoding format to the signal generating circuit; the signal amount of the first signal changes with a change in a distance between the receiving electrode and the touch panel, the first signal level mapping table includes a mapping relationship between the signal amount of the first signal, an angle level, and the encoding format, and the angle level corresponds to the inclination angle; and the signal generating circuit is further coupled to the transmitting electrode, and the signal generating circuit is configured to receive the encoding format, generate the second signal according to the encoding format, and transmit the second signal to the transmitting electrode.

For example, in the pen provided by an embodiment of the present disclosure, the signal amount of the first signal decreases with an increase of the inclination angle.

For example, the pen provided by an embodiment of the present disclosure further includes a memory, and the memory is configured to store the first signal level mapping table.

For example, in the pen provided by an embodiment of the present disclosure, the receiving electrode is a ring-shaped receiving electrode.

For example, in the pen provided by an embodiment of the present disclosure, the encoding format is a binary encoding format.

For example, the pen provided by an embodiment of the present disclosure further includes a power supply, and the power supply is configured to supply power to the controller.

At least one embodiment of the present disclosure further provides a method for detecting a pen, the pen is provided by any one of the embodiments of the present disclosure, and the method is performed by the touch panel. The method includes: transmitting the first signal to the pen; receiving the second signal transmitted by the pen, where the second signal is generated by using the encoding format corresponding to the inclination angle, and the inclination angle is determined according to the signal amount of the first signal; and determining the inclination angle between the pen and the touch panel based on the encoding format.

For example, in the method for detecting the pen provided by an embodiment of the present disclosure, determining the inclination angle between the pen and the touch panel based on the encoding format includes: identifying the encoding format of the second signal; and determining the inclination angle corresponding to the encoding format according to a second signal level mapping table, where the second signal level mapping table includes a mapping relationship between an angle level and the encoding format, and the angle level corresponds to the inclination angle.

For example, the method for detecting the pen provided by an embodiment of the present disclosure further includes: determining pressure information and position information of the pen by identifying a frequency of the second signal in a case of determining the inclination angle corresponding to the encoding format.

At least one embodiment of the present disclosure further provides a touch system, and the touch system includes the pen provided by any one of the embodiments of the present disclosure and further includes the touch panel; the touch panel is configured to transmit the first signal to the pen; the pen is configured to receive the first signal, determine the inclination angle between the pen and the touch panel according to a change in the signal amount of the first signal, generate the second signal by using the encoding format corresponding to the inclination angle, and transmit the second signal to the touch panel through the transmitting electrode; and the touch panel is further configured to receive the second signal and determine the inclination angle between the pen and the touch panel based on the encoding format of the second signal.

For example, in the touch system provided by an embodiment of the present disclosure, the touch panel is further configured to identify the encoding format of the second signal and determine the inclination angle corresponding to the encoding format according to a second signal level mapping table, the second signal level mapping table includes a mapping relationship between an angle level and the encoding format, and the angle level corresponds to the inclination angle.

For example, in the touch system provided by an embodiment of the present disclosure, the touch panel is further configured to determine pressure information and position information of the pen by identifying a frequency of the second signal in a case of determining the inclination angle corresponding to the encoding format.

For example, in the touch system provided by an embodiment of the present disclosure, the touch panel comprises at least one first touch electrode and at least one second touch electrode; the first touch electrode is configured to transmit the first signal to the pen; and the second touch electrode is configured to receive the second signal.

For example, in the touch system provided by an embodiment of the present disclosure, the touch panel further includes a touch display driving device, the touch display driving device is coupled to the first touch electrode and the second touch electrode, the touch display driving device is configured to provide signals to the first touch electrode to enable the first touch electrode to transmit the first signal to the pen, and detect signals received by the second touch electrode.

For example, in the touch system provided by an embodiment of the present disclosure, the touch display driving device is further configured to determine the inclination angle between the pen and the touch panel based on the encoding format of the second signal.

BRIEF DESCRIPTION OF THE DRAWINGS

In order to clearly illustrate the technical solution of the embodiments of the present disclosure, the drawings of the embodiments will be briefly described in the following. It is obvious that the described drawings in the following are only related to some embodiments of the present disclosure and thus are not limitative of the present disclosure.

DETAILED DESCRIPTION

Figure 1:
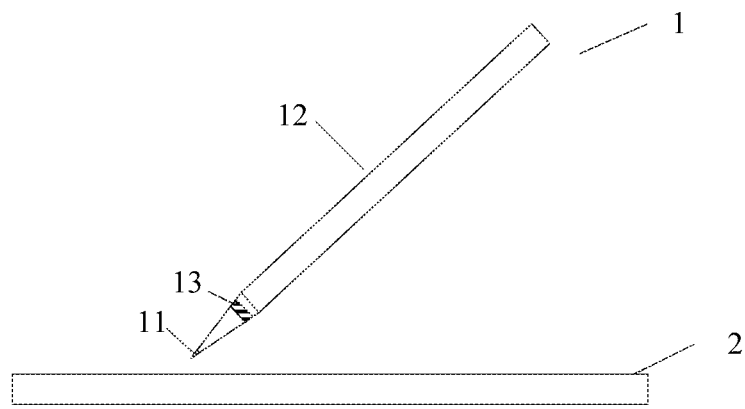
FIG. 1 is a schematic structural diagram of a touch system.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", "coupled", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Currently, the pen mainly includes two types, i.e., a passive capacitive pen and an active capacitive pen. The active capacitive pen is equivalent to a signal transmitting source, and the sensor of the touch screen can receive the signal transmitted by the active capacitive pen and determine information such as the position of the pen on the touch screen according to the signal amount of the signal. However, the general pen has two transmitting electrodes, the two transmitting electrodes output signals of different frequencies, and the touch panel calculates the inclination angle of the pen by detecting the two signals. Therefore, more time needs to be occupied in the control timing sequence, thereby correspondingly reducing the time for display and reducing the performance of the touch reporting rate.

The embodiments of the present disclosure provide a pen, a method for detecting a pen, and a touch system, so as to improve the touch reporting performance of the pen.

In the pen, the method for detecting the pen, and the touch system provided by the embodiments of the present disclosure, the pen includes a controller, a transmitting electrode, and a receiving electrode. The pen receives a first signal transmitted by a touch panel through the receiving electrode, and the controller of the pen can determine a signal amount of the first signal and determine an encoding format corresponding to an angle according to a relationship between the signal amount and the angle. Then the controller modulates, by using the encoding format, a second signal which is for the transmission by the transmitting electrode, and then transmits a modulated second signal to the touch panel, thereby omitting an additional time slot for calculating the inclination angle between the pen and the touch panel, and effectively improving the reporting performance of the pen.

With reference to FIG. 1, FIG. 1 is a schematic structural diagram of a touch system.

As illustrated in FIG. 1, two-way signal transmission can be performed between a pen 1 and a touch panel 2. The touch panel 2 transmits an uplink signal to the pen 1 to detect the communication between the pen 1 and the touch panel 2. The pen 1 transmits a signal to the touch panel 2, and the touch panel 2 determines the position of the pen 1 on the surface of the touch panel 2 according to the signal amount of the signal. The pen 1 may be an active capacitive pen. The touch panel 2 may include a substrate and a plurality of electrode blocks disposed on the substrate. The substrate may be a rigid substrate or a flexible substrate, and the material of the substrate may be glass, polyimide, etc. The electrode block may be a self-capacitive electrode block, and the self-capacitive electrode block can function as a touch electrode as well as a sensing electrode. The plurality of electrode blocks can be arranged in an array, and these electrode blocks can function as common electrodes as well as touch electrodes. In the case where the touch panel 2 is in the display phase, each electrode block is input with a common voltage and used as a common electrode; and in the case where the touch panel 2 is in the touch phase, the electrode block is input with a touch driving voltage and used as a touch electrode.

The pen 1 includes a pen tip, a pen body, a transmitting electrode provided at the pen tip, and a transmitting electrode provided on the pen body. For example, as illustrated in FIG. 1, a first transmitting electrode 11 of the pen 1 is located at the pen tip, and a second transmitting electrode 13 of the pen 1 is located on the pen body. When two-way signal transmission is performed between the pen 1 and the touch panel 2, one frame for time division multiplexing of the touch phase and the display phase is, for example, 16.67 ms.

Figure 5A:
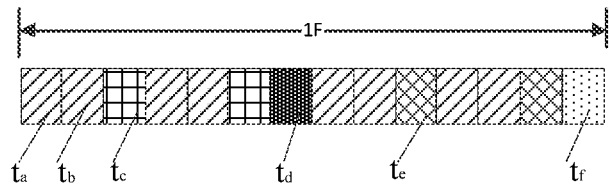
FIG. 5A and FIG. 5B are schematic diagrams of comparison of touch display multiplexing frames provided by some embodiments of the present disclosure.
Figure 5B:
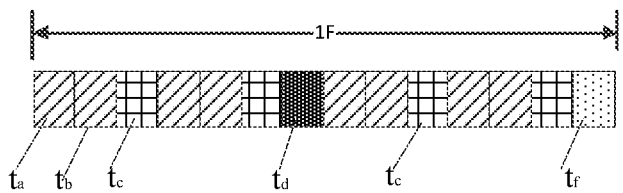

With reference to FIG. 5A and FIG. 5B, FIG. 5A and FIG. 5B are schematic diagrams of comparison of touch display multiplexing frames provided by some embodiments of the present disclosure. As illustrated in FIG. 5A, a time slot $t_a$ and a time slot $t_b$ are respectively used to detect an X coordinate and a Y coordinate of the position of the pen, a time slot $t_c$ is used for finger detection, a time slot $t_d$ is used to report sensing noise data, a time slot $t_e$ is used to detect the inclination angle of the pen, and a time slot $t_f$ is used to report the uplink signal. In one frame illustrated in FIG. 5A, 8 time slots are used to detect the pressure and position of the pen, and the reporting rate is 240 Hz; 2 time slots are used for finger touch detection, that is, the reporting rate of finger touch is 30 Hz; and 2 time slots are used for inclination detection of the pen, that is, the reporting rate of inclination is 30 Hz. Therefore, the inclination detection of the pen occupies 2 time slots, so that there is a bottleneck occurred in the reporting rate of finger touch, and the reporting rate of inclination of the pen cannot be increased.

Figure 2:
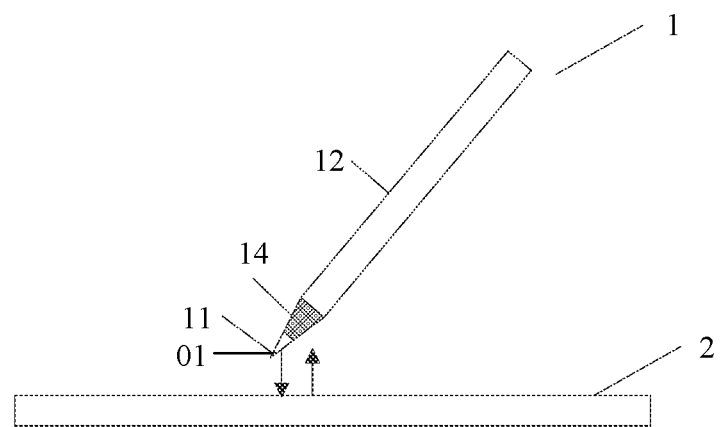
FIG. 2 is a schematic structural diagram of a touch system provided by some embodiments of the present disclosure.
Figure 8:
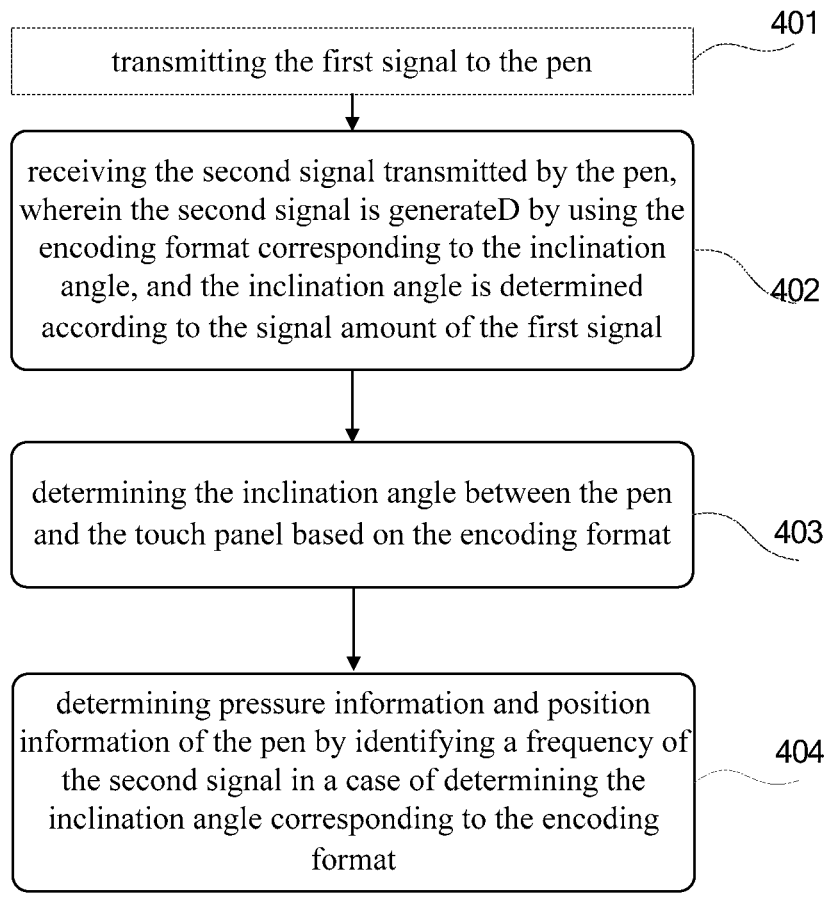
FIG. 8 is a flowchart of another method for detecting a pen provided by some embodiments of the present disclosure.

The present disclosure provides a new pen structure to solve the above-mentioned problem of the reporting performance of the pen. With reference to FIG. 2, FIG. 2 is a schematic structural diagram of a touch system provided by some embodiments of the present disclosure. As illustrated in FIG. 2, the touch system includes a pen 1 and a touch panel 2. A receiving electrode 14 is provided on the pen 1, the receiving electrode 14 is used to receive a detection signal, transmitted by the touch panel 2, from the touch panel 2, and the detection signal can be understood as a signal transmitted in the time slot $t_f$. Then, the pen 1 determines an inclination angle of the pen 1 with respect to the touch panel 2 according to a signal amount of the signal. As illustrated in FIG. 5B, the time slot $t_a$ and time slot $t_b$ are respectively used to detect the X coordinate and Y coordinate of the position of the pen 1, and are further used to detect the inclination angle. The time slot $t_c$ is used for finger detection, the time slot $t_d$ is used to report sensing noise data, and the time slot $t_f$ is used to report the uplink signal. As illustrated in FIG. 5B, in one frame of the same time length with that as illustrated in FIG. 5A, 8 time slots are used to detect the pressure and position of the pen, and are further used to detect the inclination angle. Therefore, the reporting rate of the inclination angle and the reporting rate of the pressure and position detection are both 240 Hz, thereby significantly improving the effect compared to the general pen. The time slots for finger touch detection are also increased from the usual 2 time slots to 4 time slots, that is, the reporting rate of finger touch is 60 Hz, thereby achieving a better improvement compared to the general pen, and effectively improving the reporting performance of the pen 1.

In the embodiments of the present disclosure, the reporting rate of finger touch and the reporting rate of the inclination angle (i.e., the reporting rate of inclination) of the pen are improved by omitting two time slots for the pen to transmit signals to the touch panel and receive signals from the touch panel.

Figure 3:
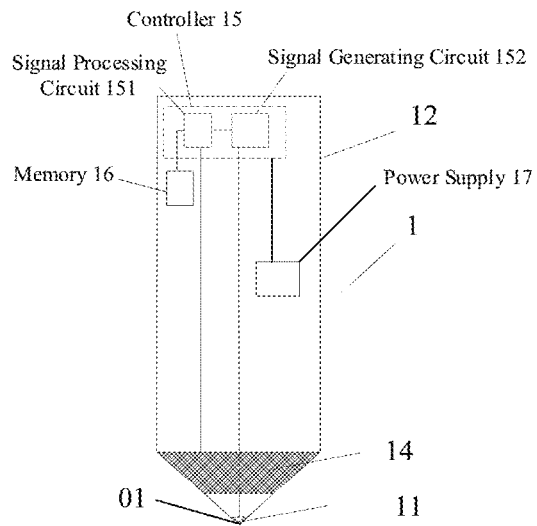
FIG. 3 is a schematic structural diagram of a pen provided by some embodiments of the present disclosure.

With reference to FIG. 3, FIG. 3 is a schematic structural diagram of a pen provided by some embodiments of the present disclosure.

As illustrated in FIG. 3, a pen 1 includes: a pen body 12, a pen tip 01, a controller 15, a transmitting electrode 11, and a receiving electrode 14. For example, the transmitting electrode 11 and the receiving electrode 14 are disposed at different positions of the pen 1.

The transmitting electrode 11 is disposed, for example, at the position of the pen tip 01. For example, the transmitting electrode 11 may be in the shape of a block, a sphere, etc., and is disposed at the top of the pen tip 01, or the transmitting electrode 11 may be one or more ring structures arranged around the pen tip 01, which is not limited in the embodiments of the present disclosure. The receiving electrode 14 is disposed, for example, at the position, away from the transmitting electrode 11 by a first distance, of the pen body 12. The receiving electrode 14 is coupled (e.g., electrically connected) to the controller 15, and the receiving electrode 14 is configured to receive a first signal transmitted by the touch panel 2 according to a first frequency, and is configured to transmit the first signal to the controller 15. For example, the receiving electrode 14 is a ring-shaped receiving electrode (i.e., a ring structure), that is, the receiving electrode 14 is disposed around the pen body 12. For example, the receiving electrode 14 may be a single ring structure or a plurality of ring structures arranged in parallel. In the case where the receiving electrode 14 includes a plurality of ring structures, the sensitivity of signal receiving can be improved. For example, the specific value of the first distance is not limited and can be determined according to practical requirements. For example, the first frequency may be determined according to practical requirements.

It should be noted that, in this embodiment, according to the above-mentioned setting method, in the case where the pen 1 is in contact with the touch panel 2, the transmitting electrode 11 is closer to the touch panel 2 than the receiving electrode 14. Certainly, the embodiments of the present disclosure are not limited in this aspect, and the transmitting electrode 11 and the receiving electrode 14 may also be disposed at other applicable positions of the pen 1. In the case where the pen 1 is in contact with the touch panel 2, the transmitting electrode 11 may also be farther away from the touch panel 2 than the receiving electrode 14, which can be determined according to practical requirements.

The controller 15 is provided, for example, inside the pen body 12, and is configured to receive the first signal from the receiving electrode 14, determine an inclination angle between the pen 1 and the touch panel 2 according to a signal amount (e.g., a signal amplitude, a signal intensity, etc.) of the first signal, and generate a second signal of a second frequency by using an encoding format corresponding to the inclination angle. The controller 15 is further coupled to the transmitting electrode 11 and is further configured to transmit the second signal to the transmitting electrode 11, and the second signal is transmitted to the touch panel 2 through the transmitting electrode 11. For example, the frequency of the second signal is called the second frequency, the second frequency is relevant to a stress level of the pen and can be determined according to the stress level of the pen, and the frequency of the second signal changes with a change of the stress level of the pen.

The transmitting electrode 11 is configured to receive the second signal from the controller 15 and transmit the second signal to the touch panel 2.

For example, in the embodiments of the present disclosure, the pen 1 may be a device configured to perform a touch operation on the touch panel 2 and having a shape similar to a pen. For example, the pen 1 has a shape that allows a user's hand to hold for writing operation, and the pen 1 may have a shape similar to the general ballpoint pen, pencil, gel pen, or the like. For example, the pen body 12 may be in the shape of a column, a stick, or a strip. For example, in some examples, the pen body 12 is approximately in a cylindrical shape and has a certain extending length. For example, the pen tip 01 refers to the top of the pen 1, and the top can be in contact with or be close to the touch panel 2 to implement signal transmission between the pen 1 and the touch panel 2. For example, the pen tip 01 may be in the shape of a cone, an inverted trapezoid, or the like. It should be noted that, in some other examples, the pen 1 may have no pen tip 01 and may only have the pen body 12. In this case, the top of the pen body 12 may be a hemispherical shape or a structure with rounded corners, thereby implementing contact with the touch panel 2.

For example, the controller 15 includes a signal processing circuit 151 and a signal generating circuit 152, and the signal processing circuit 151 is coupled to the signal generating circuit 152.

The signal processing circuit 151 is configured to calculate the signal amount of the first signal. The signal amount of the first signal changes (for example, increases or decreases) with a change in a distance between the receiving electrode 14 and the touch panel 2. The signal processing circuit 151 is further configured to determine an inclination angle corresponding to the signal amount of the first signal and an encoding format corresponding to the inclination angle according to a first signal level mapping table, and output the encoding format to the signal generating circuit 152. For example, the first signal level mapping table includes a mapping relationship between the signal amount of the first signal, an angle level, and the encoding format. For example, the angle level corresponds to the inclination angle.

The signal generating circuit 152 is further coupled to the transmitting electrode 11. The signal generating circuit 152 is configured to receive the encoding format, generate the second signal according to the encoding format, and transmit the second signal to the transmitting electrode 11.

The first signal level mapping table is illustrated as the following table. In the table, the inclination degree (i.e., the angle level described above) is used to indicate the inclination angle between the pen 1 and the touch panel 2. The sensing amount (i.e., the signal amount) of the first signal received by the pen 1 gradually decreases with the increase of the inclination angle. The central axis of the pen 1 generally acts as one side of the inclination angle, and the upper surface (i.e., the surface close to the pen 1) of the touch panel 2 acts as the other side of the inclination angle. Assuming that the inclination angle between the two sides is 30°, the sensing amount sensed by the receiving electrode 14 is 100%, and the sensing amount gradually decreases to a range of 0% to 10% as the inclination angle increases to 90°. Based on the relationship between the inclination angle and the sensing amount, the inclination angle can be divided into several levels. Considering the user's writing habits, the range of the inclination angle is usually ±60°. The inclination angle starts from 30°, and the level is set every 5°. As illustrated in the following Table (1), Table (1) is the first signal level mapping table, and the first signal level mapping table includes the mapping relationship between the signal amount of the first signal, the angle level, and the encoding format.

TABLE (1)

| inclination degree | 1 | 2 | 3 | 4 | 5 | 6 | 7 |
|---|---|---|---|---|---|---|---|
| sensing amount of the first signal | 10% | 20% | 30% | 40% | 50% | 60% | 70% |
| encoding format corresponding to the second signal | 001 | 010 | 011 | 100 | 101 | 110 | 111 |

For example, the sensing amount of the first signal may also be an interval range, such as 0% to 10%, 10% to 20%, 20% to 40%, 40% to 60%, 60% to 80%, and 80% to 100%.

The encoding format corresponding to the second signal is used to modulate the second signal. For example, binary amplitude encoding modulation may be used, that is, the above encoding format may be a binary encoding format. Certainly, the embodiments of the present disclosure are not limited in this aspect, and other applicable encoding formats may also be used to modulate the second signal, which can be determined according to practical requirements. After the transmission frequency is determined according to the stress level, the transmission signal is modulated by using the encoding format, so as to obtain the second signal. For example, the second signal is used to detect the X coordinate and Y coordinate of the position of the pen 1 during the time slot $t_a$ and the time slot $t_b$, respectively, so that compared to the general manner, the time slots occupied by the second signal can be increased from the original 2 time slots to 8 time slots, and the reporting rate of inclination is increased to 240 Hz. The reporting rate of finger touch is also increased from the original 2 time slots to 4 time slots, and the reporting rate is increased to 60 Hz.

For example, the pen 1 may further include a memory 16, and the memory 16 is configured to store the first signal level mapping table. The first signal level mapping table may be fixed set or re-entered, and may also be received from other electronic devices according to requirements. For example, the memory 16 may be a read-only memory (ROM), a hard disk, an erasable programmable read-only memory (EPROM), a compact disc read-only memory (CD-ROM), a USB memory, a flash memory, etc.

Similarly, the signal level mapping table is also stored in the touch panel 2, and the signal level mapping table stored in the touch panel 2 is referred to as a second signal level mapping table. For example, the touch panel 2 may also include a memory, and the memory is configured to store the second signal level mapping table. The second signal level mapping table may be fixed set or re-entered, and may also be received from other electronic devices according to requirements. For example, the second signal level mapping table stored in the touch panel 2 includes a mapping relationship between the angle level and the encoding format. For example, the mapping relationship between the angle level and the encoding format in the second signal level mapping table is the same as the mapping relationship between the angle level and the encoding format in the first signal level mapping table.

For example, as illustrated in FIG. 3, in some examples, the pen 1 may further include a power supply 17, and the power supply 17 is configured to supply power to the controller 15. For example, the power supply 17 may further supply power to the transmitting electrode 11 and/or the receiving electrode 14 according to the practical circuit setting manner. For example, the power supply 17 is provided inside the pen body 12. For example, the power supply 17 is coupled to the controller 15 through an electrical wire, and may be further coupled to the transmitting electrode 11 and/or the receiving electrode 14. The power supply 17 may be a built-in power supply, e.g., any applicable power supply component such as a secondary battery (e.g., a lithium battery), a primary battery (e.g., an alkaline battery), or a solar cell, or may be an interface to an external power supply, for example, coupled to the power supply network through a wire, a transformer, etc., which is not limited in the embodiments of the present disclosure.

Figure 4:
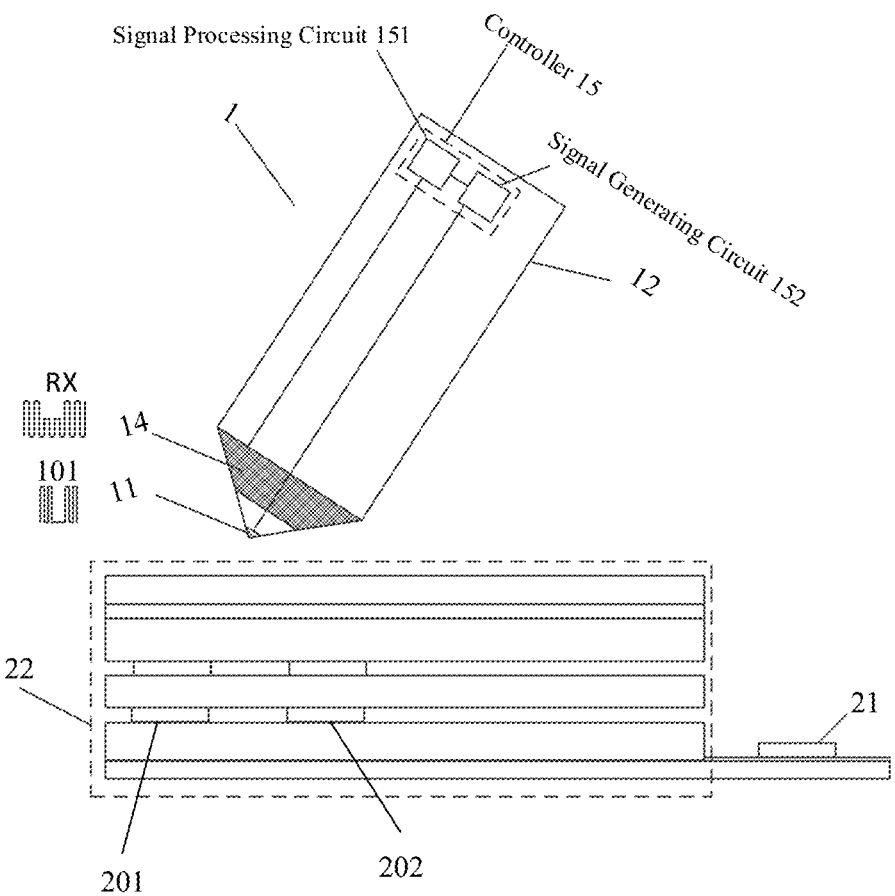
FIG. 4 is a schematic structural diagram of another touch system provided by some embodiments of the present disclosure.

In order to further describe the principle of detecting the pen in detail, the embodiments of the present disclosure further provide a touch system. With reference to FIG. 4, FIG. 4 is a schematic structural diagram of a touch system provided by some embodiments of the present disclosure.

As illustrated in FIG. 4, the structure of the pen 1 is basically the same as the structure of the pen 1 illustrated in FIG. 3, and the detailed description may be referred to the description of FIG. 3.

For example, the touch panel 2 may include a touch substrate 22, the touch substrate 22 may be a thin film transistor (TFT) substrate and include a self-capacitive in-cell structure, and a common electrode Com of the thin film transistor (TFT) substrate can serve as a touch electrode. For example, the common electrode (that is, the touch electrode) may be made of a transparent conductive material, such as indium tin oxide (ITO), etc. For example, a layer of metal wires can be provided in the touch substrate 22 to function as touch wires, the touch wires can be used to couple the touch electrode in the touch substrate 22 to a touch display driving device 21, and then a conductive material (such as ITO) is used to implement the touch electrode (the common electrode).

For example, the touch panel 2 includes at least one first touch electrode 201 and at least one second touch electrode 202. The first touch electrode 201 is configured to transmit the first signal to the pen 1. The second touch electrode 202 is configured to receive the second signal. For example, the touch panel 2 further includes a touch display driving device 21, and the touch display driving device 21 is coupled to the first touch electrode 201 and the second touch electrode 202. The touch display driving device 21 is configured to provide signals to the first touch electrode 201 to enable the first touch electrode 201 to transmit the first signal to the pen 1, and detect signals received by the second touch electrode 202. For example, the touch display driving device 21 is further configured to determine the inclination angle between the pen 1 and the touch panel 2 based on the encoding format of the second signal.

The touch panel 2 may be a touch display driving panel, and the touch panel 2 may be applied to electronic devices having a touch function, such as a display, a tablet computer, a smart phone, etc. For example, the touch panel 2 may be a liquid crystal display (LCD) panel having a touch function, an organic light-emitting diode (OLED) display panel having a touch function, or the like. In the case where the touch panel 2 is an LCD panel having a touch function, the LCD panel may include the above-mentioned TFT substrate, and may further include a structure such as a color film substrate. In the case where the touch panel 2 is an OLED display panel having a touch function, the OLED display panel may include the above-mentioned TFT substrate, and the TFT substrate is provided with an organic electroluminescent material and may further include a color film substrate and the like according to requirements. Certainly, the embodiments of the present disclosure are not limited in this aspect. The touch panel 2 may also be a touch panel without a display function, and in this case, the touch panel 2 only implements a touch function and does not perform display. For example, the touch panel 2 may include an in-cell structure, or may include an on-cell structure, which is not limited in the embodiments of the present disclosure.

The touch display driving device 21 may be an integrated circuit, and may also be called a touch and display driver integration (TDDI), and the display operation and touch operation are controlled by using a time division multiplexing method. During displaying, the touch electrode serves as the common electrode, and the touch display driving device 21 provides the common (COM) signal to the common electrode. During touching, the touch electrode senses the touch signal of the finger or the transmission signal of the pen, and transmits these signals to the touch display driving device 21 for further data processing and calculation.

Figure 6:
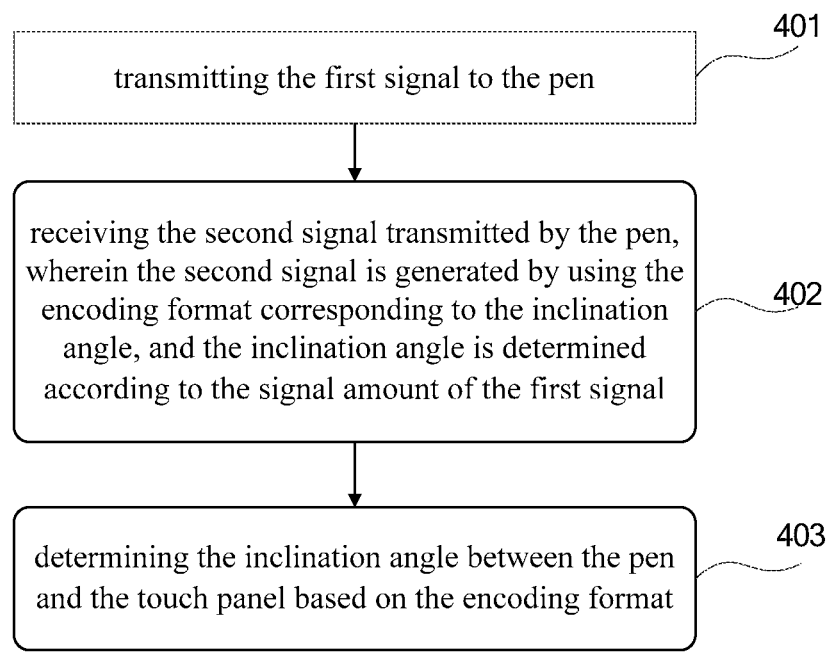
FIG. 6 is a flowchart of a method for detecting a pen provided by some embodiments of the present disclosure.

In the following, a process in which the touch panel 2 identifies the second signal to obtain the inclination angle of the pen 1 after receiving the second signal transmitted by the pen 1 is further described. As illustrated in FIG. 6, FIG. 6 is a flowchart of a method for detecting a pen provided by some embodiments of the present disclosure. The method is performed, for example, by the above touch panel 2. For example, in some embodiments, the method includes following operations.

Step 401: sending the first signal to the pen.

Step 402: receiving the second signal transmitted by the pen, where the second signal is generated by using the encoding format corresponding to the inclination angle, and the inclination angle is determined according to the signal amount of the first signal.

Step 403: determining the inclination angle between the pen and the touch panel based on the encoding format.

In the above steps, for example, the touch panel transmits the first signal to the pen according to the first frequency, and after the pen receives the first signal, the pen determines the sensing amount of the first signal and then determines the inclination angle between the touch panel and the pen according to the range which the sensing amount belongs to, with reference to the angle level illustrated in Table (1), and simultaneously determines the encoding format corresponding to the inclination angle. For example, as illustrated in Table (1), in the case where the sensing amount of the first signal received by the pen is 50%, the angle level is indicated as 5, and the inclination angle is about 40°, so that 40° represents the inclination angle of the pen with respect to the touch panel. In this case, the signal of the second frequency is modulated according to the encoding format 100 to generate the second signal. For example, the second frequency is relevant to the stress level of the pen, and can be determined according to the stress level of the pen. For example, the first frequency is irrelevant to the stress level of the pen, and may be determined according to practical requirements.

In the case where the touch panel receives the sensing amount of the second signal, the stress level of the pen can be identified based on the second frequency, and simultaneously, the inclination angle of the pen with respect to the touch panel can also be identified according to the encoding format of the second signal.

In the pen, the touch system, or the method for detecting the pen provided by the embodiments of the present disclosure, the touch panel can obtain two types of information carried by the second signal by identifying the second signal, so that the pressure information and the inclination angle of the pen can be simultaneously obtained, and the position of the pen can be calculated according to the inclination angle, thereby effectively reducing the interaction time slot when the pen and the touch panel interact with each other, and improving the reporting rate of finger touch and the reporting rate of inclination angel of the pen.

Figure 7:
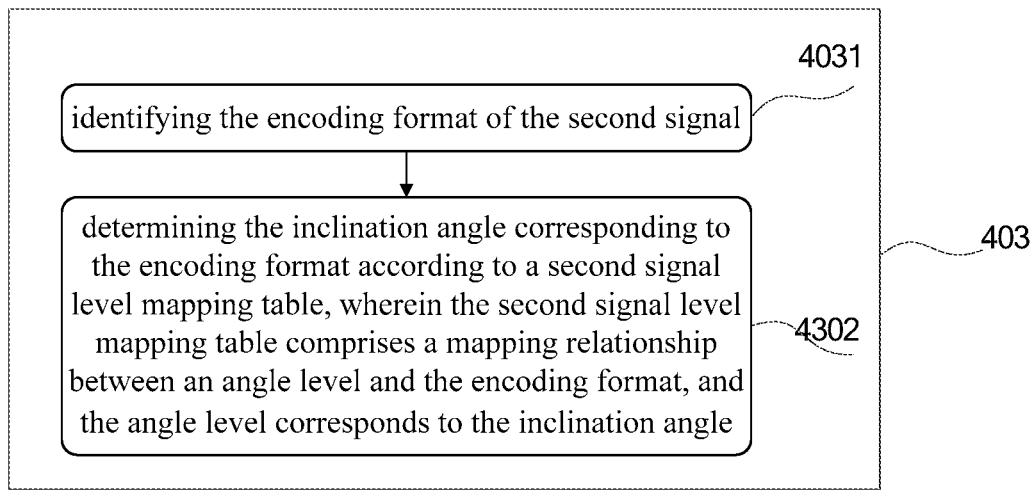
FIG. 7 is a flowchart of step 403 of a method for detecting a pen provided by some embodiments of the present disclosure.

For example, with reference to FIG. 7, FIG. 7 is a flowchart of step 403 of a method for detecting a pen provided by some embodiments of the present disclosure. For example, as illustrated in FIG. 7, in some examples, step 403 in FIG. 6 may further include following operations.

Step 4031: identifying the encoding format of the second signal.

Step 4032: determining the inclination angle corresponding to the encoding format according to a second signal level mapping table, where the second signal level mapping table includes a mapping relationship between the angle level and the encoding format.

For example, the above second signal level mapping table is stored in the touch panel, and the mapping relationship between the angle level and the encoding format in the second signal level mapping table is the same as the mapping relationship between the angle level and the encoding format in the first signal level mapping table described above, so that the inclination angle information transmitted by the pen can be obtained.

For example, in some examples, as illustrated in FIG. 8, in addition to step 401 to step 403, the method for detecting the pen may further include following operations.

Step 404: determining pressure information and position information of the pen by identifying a frequency of the second signal in the case of determining the inclination angle corresponding to the encoding format.

For example, the detailed description of using the frequency of the second signal to determine the pressure information and the position information can be referred to the conventional design, and details are not described herein again.

In the embodiments of the present disclosure, for example, the touch panel may include a memory, and the touch panel may be, for example, a display having a touch function, a tablet computer having a touch function, a smart phone having a touch function, etc., and may include a touch display driving device. For example, the touch display driving device obtains the second signal level mapping table from the memory, and identifies the angle level according to the encoding format, thereby obtaining the inclination angle of the pen. Further, the frequency of the second signal can be identified to obtain the pressure information of the pen, and the position information of the pen is calculated according to the inclination angle.

It should be noted that the method for detecting the pen may further include more steps, and the execution sequence of each step is not limited, which may be determined according to practical requirements.

It should be noted that although the operations of the method provided by the present disclosure are described in a particular sequence in the drawings, it does not require or imply that these operations must be performed in that particular order, or that all the operations illustrated must be performed to achieve the desired result. Instead, the execution sequence of the steps illustrated in the flowchart can be changed. Additionally or alternatively, certain steps may be omitted, multiple steps may be combined into one step for execution, and/or one step may be divided into multiple steps for execution.

The following statements should be noted.

(1) The accompanying drawings involve only the structure(s) in connection with the embodiment(s) of the present disclosure, and other structure(s) can be referred to common design(s).

(2) In case of no conflict, features in one embodiment or in different embodiments can be combined to obtain new embodiments.

What have been described above are only specific implementations of the present disclosure, the protection scope of the present disclosure is not limited thereto, and the protection scope of the present disclosure should be based on the protection scope of the claims.

What is claimed is:

1. A pen, configured to operate on a touch panel, wherein the pen comprises: a controller, a transmitting electrode, and a receiving electrode;

the transmitting electrode and the receiving electrode are at different positions of the pen, and the receiving electrode comprises a plurality of ring structures arranged in parallel;

the receiving electrode is coupled to the controller, and the receiving electrode is configured to receive a first signal transmitted by the touch panel and transmit the first signal to the controller;

the controller is further coupled to the transmitting electrode, and the controller is configured to receive the first signal from the receiving electrode, determine an inclination angle between the pen and the touch panel according to a signal amount of the first signal, generate a second signal by using an encoding format corresponding to the inclination angle, and transmit the second signal to the transmitting electrode;

the transmitting electrode is configured to receive the second signal from the controller and transmit the second signal to the touch panel;

wherein the controller further comprises a signal processing circuit and a signal generating circuit, and the signal processing circuit is coupled to the signal generating circuit;

the signal processing circuit is configured to calculate the signal amount of the first signal, determine the inclination angle corresponding to the signal amount of the first signal and the encoding format corresponding to the inclination angle according to a first signal level mapping table, and output the encoding format to the signal generating circuit, the signal amount of the first signal changes with a change in a distance between the receiving electrode and the touch panel, the first signal level mapping table comprises a mapping relationship between the signal amount of the first signal, an angle level, and the encoding format, and the angle level corresponds to the inclination angle;

the signal generating circuit is further coupled to the transmitting electrode, and the signal generating circuit is configured to receive the encoding format, generate the second signal according to the encoding format, and transmit the second signal to the transmitting electrode, and the second signal is obtained through signal modulation by using the encoding format; and a time slot used to detect an X coordinate of a position of the pen and a time slot used to detect a Y coordinate of the position of the pen are different and are both further used to detect the inclination angle.

2. The pen according to claim 1, further comprising a pen body and a pen tip, wherein the transmitting electrode is at a position of the pen tip, the receiving electrode is at a position, away from the transmitting electrode by a first distance, of the pen body, and the controller is inside the pen body.

3. The pen according to claim 1, wherein a frequency of the second signal is determined according to a stress level of the pen, and the frequency of the second signal changes with a change of the stress level of the pen.

4. The pen according to claim 1, wherein the signal amount of the first signal decreases with an increase of the inclination angle.

5. The pen according to claim 1, further comprising a memory, wherein the memory is configured to store the first signal level mapping table.

6. The pen according to claim 1, wherein the encoding format is a binary encoding format.

7. The pen according to claim 1, further comprising a power supply, wherein the power supply is configured to supply power to the controller.

8. A method for detecting a pen, wherein the pen is configured to operate on a touch panel, and the pen comprises: a controller, a transmitting electrode, and a receiving electrode;

the transmitting electrode and the receiving electrode are at different positions of the pen, and the receiving electrode comprises a plurality of ring structures arranged in parallel;

the receiving electrode is coupled to the controller, and the receiving electrode is configured to receive a first signal transmitted by the touch panel and transmit the first signal to the controller;

the controller is further coupled to the transmitting electrode, and the controller is configured to receive the first signal from the receiving electrode, determine an inclination angle between the pen and the touch panel according to a signal amount of the first signal, generate a second signal by using an encoding format corresponding to the inclination angle, and transmit the second signal to the transmitting electrode;

the transmitting electrode is configured to receive the second signal from the controller and transmit the second signal to the touch panel;

the controller further comprises a signal processing circuit and a signal generating circuit, and the signal processing circuit is coupled to the signal generating circuit;

the signal processing circuit is configured to calculate the signal amount of the first signal, determine the inclination angle corresponding to the signal amount of the first signal and the encoding format corresponding to the inclination angle according to a first signal level mapping table, and output the encoding format to the signal generating circuit, the signal amount of the first signal changes with a change in a distance between the receiving electrode and the touch panel, the first signal level mapping table comprises a mapping relationship between the signal amount of the first signal, an angle level, and the encoding format, and the angle level corresponds to the inclination angle;

the signal generating circuit is further coupled to the transmitting electrode, and the signal generating circuit is configured to receive the encoding format, generate the second signal according to the encoding format, and transmit the second signal to the transmitting electrode, and the second signal is obtained through signal modulation by using the encoding format; and the method is performed by the touch panel, and the method comprises:

transmitting the first signal to the pen;

receiving the second signal transmitted by the pen, wherein the second signal is generated by using the encoding format corresponding to the inclination angle, and the inclination angle is determined according to the signal amount of the first signal; and determining the inclination angle between the pen and the touch panel based on the encoding format, wherein a time slot used to detect an X coordinate of a position of the pen and a time slot used to detect a Y coordinate of the position of the pen are different and are both further used to detect the inclination angle.

9. The method according to claim 8, wherein determining the inclination angle between the pen and the touch panel based on the encoding format comprises:

identifying the encoding format of the second signal; and determining the inclination angle corresponding to the encoding format according to a second signal level mapping table, wherein the second signal level mapping table comprises a mapping relationship between an angle level and the encoding format, and the angle level corresponds to the inclination angle.

10. The method according to claim 8, further comprising:

determining pressure information and position information of the pen by identifying a frequency of the second signal in a case of determining the inclination angle corresponding to the encoding format.

11. A touch system, comprising a pen and a touch panel, wherein the pen is configured to operate on the touch panel, and the pen comprises: a controller, a transmitting electrode, and a receiving electrode;

the transmitting electrode and the receiving electrode are at different positions of the pen, and the receiving electrode comprises a plurality of ring structures arranged in parallel;

the receiving electrode is coupled to the controller, and the receiving electrode is configured to receive a first signal transmitted by the touch panel and transmit the first signal to the controller;

the controller is further coupled to the transmitting electrode, and the controller is configured to receive the first signal from the receiving electrode, determine an inclination angle between the pen and the touch panel according to a signal amount of the first signal, generate a second signal by using an encoding format corresponding to the inclination angle, and transmit the second signal to the transmitting electrode;

the transmitting electrode is configured to receive the second signal from the controller and transmit the second signal to the touch panel;

the touch panel is configured to transmit the first signal to the pen;

the pen is configured to receive the first signal, determine the inclination angle between the pen and the touch panel according to a change in the signal amount of the first signal, generate the second signal by using the encoding format corresponding to the inclination angle, and transmit the second signal to the touch panel through the transmitting electrode; and the touch panel is further configured to receive the second signal and determine the inclination angle between the pen and the touch panel based on the encoding format of the second signal;

the controller further comprises a signal processing circuit and a signal generating circuit, and the signal processing circuit is coupled to the signal generating circuit;

the signal processing circuit is configured to calculate the signal amount of the first signal, determine the inclination angle corresponding to the signal amount of the first signal and the encoding format corresponding to the inclination angle according to a first signal level mapping table, and output the encoding format to the signal generating circuit, the signal amount of the first signal changes with a change in a distance between the receiving electrode and the touch panel, the first signal level mapping table comprises a mapping relationship between the signal amount of the first signal, an angle level, and the encoding format, and the angle level corresponds to the inclination angle;

the signal generating circuit is further coupled to the transmitting electrode, and the signal generating circuit is configured to receive the encoding format, generate the second signal according to the encoding format, and transmit the second signal to the transmitting electrode, and the second signal is obtained through signal modulation by using the encoding format; and a time slot used to detect and X coordinate of a position of the pen and a time slot used to detect a Y coordinate of the position of the pen are different and are both further used to detect the inclination angle.

12. The touch system according to claim 11, wherein the touch panel is further configured to identify the encoding format of the second signal and determine the inclination angle corresponding to the encoding format according to a second signal level mapping table, the second signal level mapping table comprises a mapping relationship between an angle level and the encoding format, and the angle level corresponds to the inclination angle.

13. The touch system according to claim 11, wherein the touch panel is further configured to determine pressure information and position information of the pen by identifying a frequency of the second signal in a case of determining the inclination angle corresponding to the encoding format.

14. The touch system according to claim 11, wherein the touch panel comprises at least one first touch electrode and at least one second touch electrode;

the first touch electrode is configured to transmit the first signal to the pen; and the second touch electrode is configured to receive the second signal.

15. The touch system according to claim 14, wherein the touch panel further comprises a touch display driving device, the touch display driving device is coupled to the first touch electrode and the second touch electrode, the touch display driving device is configured to provide signals to the first touch electrode to enable the first touch electrode to transmit the first signal to the pen, and detect signals received by the second touch electrode.

16. The touch system according to claim 15, wherein the touch display driving device is further configured to determine the inclination angle between the pen and the touch panel based on the encoding format of the second signal.

* * * * *